(12) United States Patent
Lin et al.

(10) Patent No.: US 7,972,066 B1
(45) Date of Patent: Jul. 5, 2011

(54) ONE-PIECE OPTICAL FIBER ADAPTER

(75) Inventors: I En Lin, Taipei (TW); Jyh Cherng Yang, Taipei (TW)

(73) Assignee: Cross Multimedia Incorporation, Sinjhuang (TW)

( * ) Notice: Subject to any disclaimer, the term of this patent is extended or adjusted under 35 U.S.C. 154(b) by 0 days.

(21) Appl. No.: 12/775,764

(22) Filed: May 7, 2010

(30) Foreign Application Priority Data

Mar. 8, 2010 (TW) ................................ 99106567 A

(51) Int. Cl.
*G02B 6/36* (2006.01)
*G02B 6/38* (2006.01)

(52) U.S. Cl. ................ 385/55; 385/53; 385/70

(58) Field of Classification Search .................. None
See application file for complete search history.

(56) References Cited

U.S. PATENT DOCUMENTS

| | | | |
|---|---|---|---|
| 5,317,663 A * | 5/1994 | Beard et al. ..................... | 385/70 |
| 5,481,634 A | 1/1996 | Anderson et al. | |
| 5,937,121 A | 8/1999 | Ott et al. | |
| 6,619,856 B1 | 9/2003 | Lampert et al. | |
| 6,908,233 B2 * | 6/2005 | Nakajima et al. ................ | 385/53 |
| 6,932,514 B2 | 8/2005 | Anderson et al. | |
| 2010/0239220 A1 * | 9/2010 | Lin et al. ....................... | 385/134 |

FOREIGN PATENT DOCUMENTS

JP 2008026778 A 2/2008

* cited by examiner

*Primary Examiner* — Hemang Sanghavi
(74) *Attorney, Agent, or Firm* — Lowe, Hauptman, Ham & Berner, LLP

(57) ABSTRACT

An optical fiber adapter according to the present invention includes a main body, an inner housing and a cover plate. The main body has an axial cavity defined by a first wall, a second wall, a third wall and a fourth wall, wherein the first wall faces the third wall and connects with the second and fourth walls. The axial cavity has two opposing axial openings and is configured to receive the inner housing. An access opening is arranged on the first wall for the inner housing to place within the axial cavity. A plurality of protruding portions is positioned on the second and fourth walls, respectively, wherein each the protruding portion has an indentation formed thereon and facing the access opening. The cover plate is configured to cover the access opening on the first wall of the main body, wherein the cover plate has a plurality of protrusions formed thereon and positioning corresponding to the indentations on the protruding portions of the main body. When the protrusions on the cover plate are melted and the cover plate is brought to cover the access opening, the molten protrusions will bond with the protruding portions of the main body.

12 Claims, 6 Drawing Sheets

ONE-PIECE OPTICAL FIBER ADAPTER

CROSS REFERENCE TO RELATED APPLICATION

This application claims the priority benefit of Taiwan Patent Application Serial Number 099106567 filed Mar. 8, 2010, the full disclosure of which is incorporated herein by reference.

BACKGROUND OF THE INVENTION

1. Field of the Invention

The present invention relates to an optical fiber adapter, and more particularly, to a one-piece optical fiber adapter.

2. Description of the Related Art

Fiber optics has revolutionized communication through out the world. With the increased used of fiber optics it has become increasingly important to be able to connect and disconnect fiber optic cables from various sources. Two fiber optic cables can be optically coupled so that they are in communication with each other by using connectors and an adapter, thereby putting each fiber optic cable in communication with the other. The connectors are placed on the end of each cable and then plugged into the adapter. The adapter has two openings each one designed to receive a connector.

The conventional optical fiber adapters consist of two halves, each halve being identical. Each half consists generally of a rectangular cylinder having a flange at one end. Inside each half would be placed half of an inner housing. The inner housing is generally a round cylinder with a flange at one end. Each adapter half has a ridge located just inside from its flange so that the inner housing could be placed in the adapter through the opening proximate to the flange on the adapter half. Once the inner housing is inserted into each adapter half, the two halves are connected by ultrasonically welding the two flanges of the adapter halves together.

However, the above design presents serious problems. The cables are naturally flexed in use when the adapter remains fixed. The related stress of this situation can cause the two halves of the adapter to separate from each other after time. In the prior art, this problem can be solved by constructing the adapter halves from metal which gives the adapter enough strength to withstand these stresses. However, this too presented a problem as metal is much more expensive to purchase and mold than the plastic one.

In order to solve the above problem, some manufactures provide so-called one-piece optical fiber adapter. Referring to FIG. 1, a conventional one-piece optical fiber adapter 100 includes a unitary molded plastic main body 110 and a plastic cover plate 190. The main body 110 has an axial cavity 120 defined by top wall 111, bottom wall 112, right wall 113 and left wall 114. The axial cavity 120 of the main body 110 has opposing first opening 122 and second opening 124 in the axial direction.

Located on the exterior of the main body 110 is a pair of tabs 132 and 134. One tab 132 is located on the right wall 113 and the other tab 134 is located on the left wall 114. The tabs 132 and 134 are operative in supporting the adapter 100 on a surface. Ac access opening 150 is located on the top wall 150. The access opening 150 allows the inner housing 160 to be inserted into the axial cavity 120 of the main body 110 and also allows the main body 110 to be constructed by injection molding. After the inner housing 160 is inserted into the axial cavity 120, the cover plate 190 is used to cover the access opening 150 and can be ultrasonically weld to the main body 110. The assembly of the optical fiber adapter is illustrated in FIG. 2.

In order to facilitate the cover plate 190 to be attached to the main body 110, a plurality of bar protruding portions 170 is located near the access opening 150 on the inner surfaces of the left and right walls 114, 113. In addition, referring to FIG. 3, a plurality of bar protrusions 192 is positioned on the cover plate 190 and corresponding to the bar protruding portions 170.

When desiring to attach the cover plate 190 to the main body 110, the bar protrusions 192 on the cover plate 190 are ultrasonically melted and bonded with the bar protruding portions 170 on the left and right walls 114, 113.

However, if the ultrasonic welding is not well controlled, the molten protrusions 192 will be likely to overflow to the interior space of the cavity 120. This will hinder optical fiber connectors from insertion into the adapter 100.

Accordingly, there exists a need to provide a one-piece optical fiber adapter to solve the aforesaid problems.

SUMMARY OF THE INVENTION

The present invention provides an optical fiber adapter that can solve the problem of the overflow of the molten protrusions when assembling the adapter.

In one embodiment, the optical fiber adapter of the present invention includes a main body, an inner housing and a cover plate. The main body has an axial cavity defined by a first wall, a second wall, a third wall and a fourth wall, wherein the first wall faces the third wall and connects with the second and fourth walls. The axial cavity has two opposing axial openings and is configured to receive the inner housing. An access opening is arranged on the first wall for the inner housing to place within the axial cavity. A plurality of protruding portions is positioned on the second and fourth walls, respectively, wherein each the protruding portion has an indentation formed thereon and facing the access opening. The cover plate is configured to cover the access opening on the first wall of the main body, wherein the cover plate has a plurality of protrusions formed thereon and positioning corresponding to the indentations on the protruding portions of the main body. When the protrusions on the cover plate are melted and the cover plate is brought to cover the access opening, the molten protrusions will bond with the protruding portions of the main body.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENT

Figure 4:
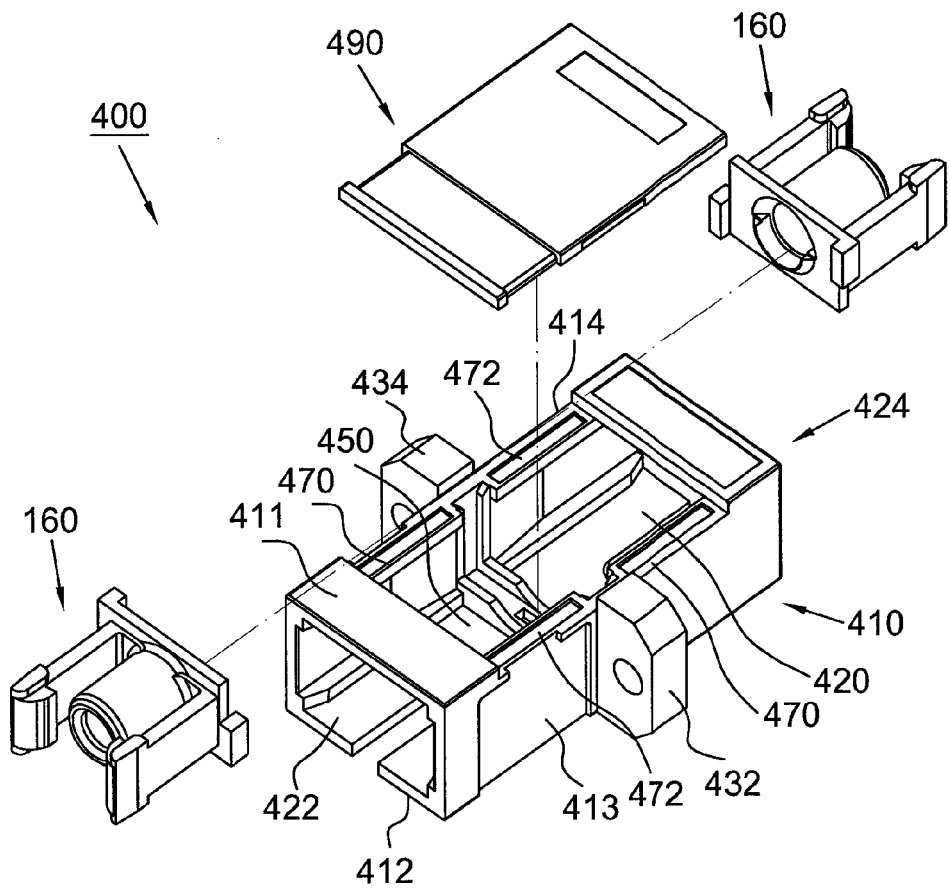
FIG. 4 is an elevated perspective view of the one-piece optical fiber adapter according to the first embodiment of the present invention.

Referring to FIG. 4, the one-piece optical fiber adapter 400 according to the first embodiment of the present invention includes a unitary molded plastic main body 410 and a plastic cover plate 490. In the preferred embodiment, the main body 410 has an axial cavity 420 defined by top wall 411, bottom wall 412, right wall 413 and left wall 414. The axial cavity 420 of the main body 410 has opposing first opening 422 and second opening 424 in the axial direction.

Located on the exterior of the main body 410 is a pair of tabs 432 and 434. One tab 432 is located on the right wall 413 and the other tab 134 is located on the left wall 414. The tabs 432 and 434 are operative in supporting the adapter 400 on a surface. Ac access opening 450 is located on the top wall 450. The access opening 450 allows the inner housing 160 of FIG. 1 to be inserted into the axial cavity 420 of the main body 410 and also allows the main body 410 to be constructed by injection molding.

Figure 5:
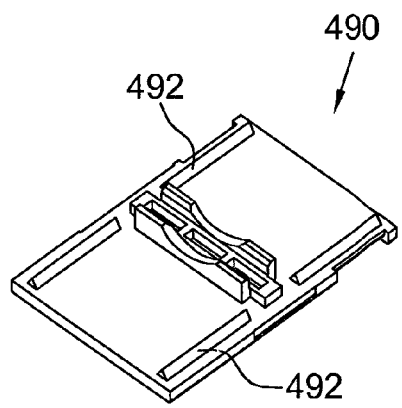
FIG. 5 is an elevated perspective view of the cover plate of the one-piece optical fiber adapter according to the first embodiment of the present invention.

In addition, a plurality of rectangular bar protruding portions 470 extends from the top of the left and right walls 414, 413, wherein each the protruding portion 470 has a rectangular indentation 472 formed thereon and facing the access opening 450. Referring to FIG. 5, a plurality of bar protrusions 492 is positioned on the cover plate 490 and corresponding to the indentation 472.

Figure 1:
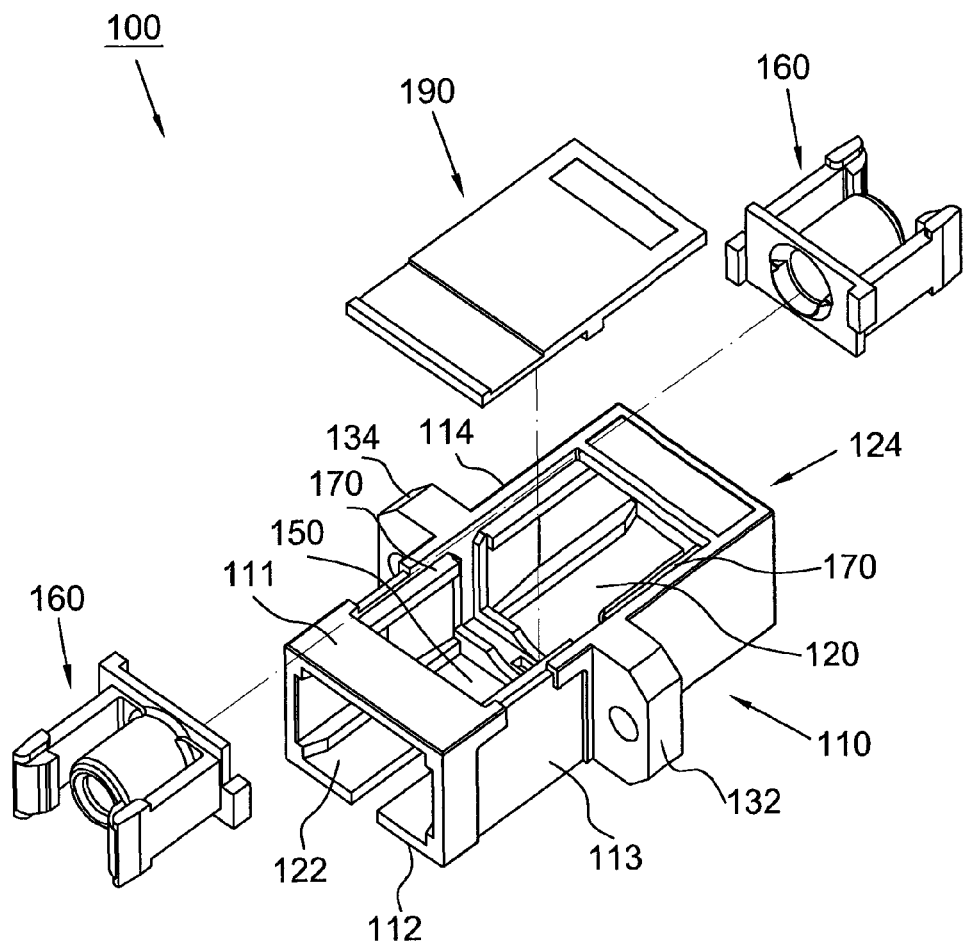
FIG. 1 is an exploded view of a conventional one-piece optical fiber adapter.
Figure 2:
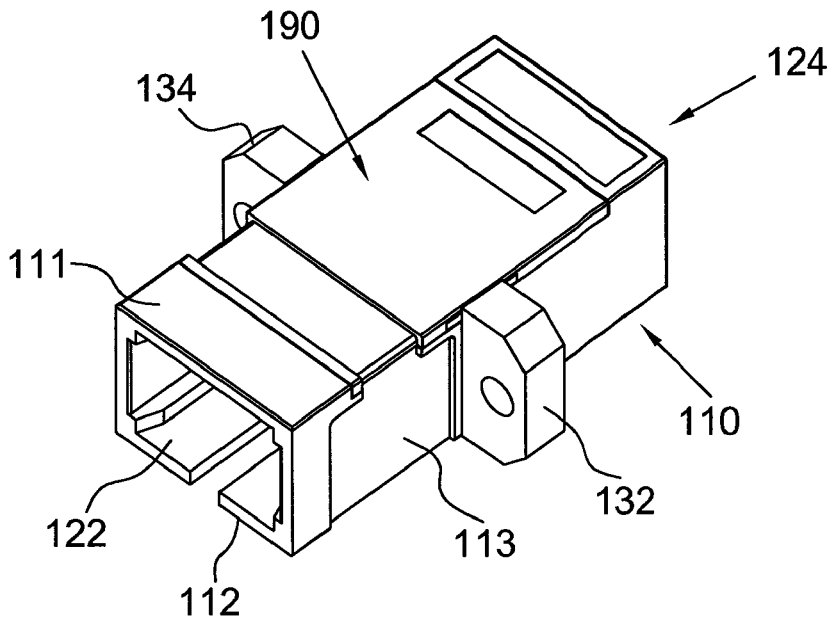
FIG. 2 is an elevated perspective view of the conventional one-piece optical fiber adapter.
Figure 3:
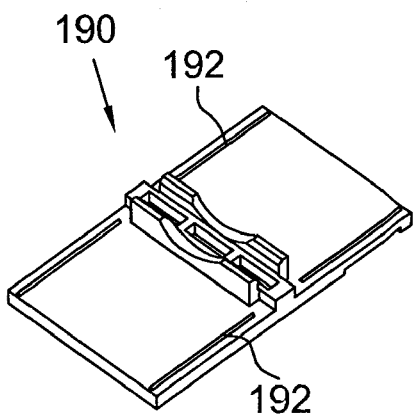
FIG. 3 is an elevated perspective view of the cover plate of the conventional one-piece optical fiber adapter.

When desiring to assemble the optical fiber adapter 400, the inner housing 160 of FIG. 1 is inserted into the axial cavity 420 through the access opening 450. Afterward, the protrusions 492 on the cover plate 490 are ultrasonically melted and the cover plate 490 is brought to cover the access opening 450. At this moment the molten protrusions 492 will bond to the protruding portions 470 of the left and right walls 414, 413.

Since the indentations 472 are present on the protruding portions 470, the molten protrusions 492 will be received and confined in the indentations 472 when the cover plate 490 covers the access opening 450. This solves the prior art problem of the overflow of the molten protrusions 492.

Figure 6:
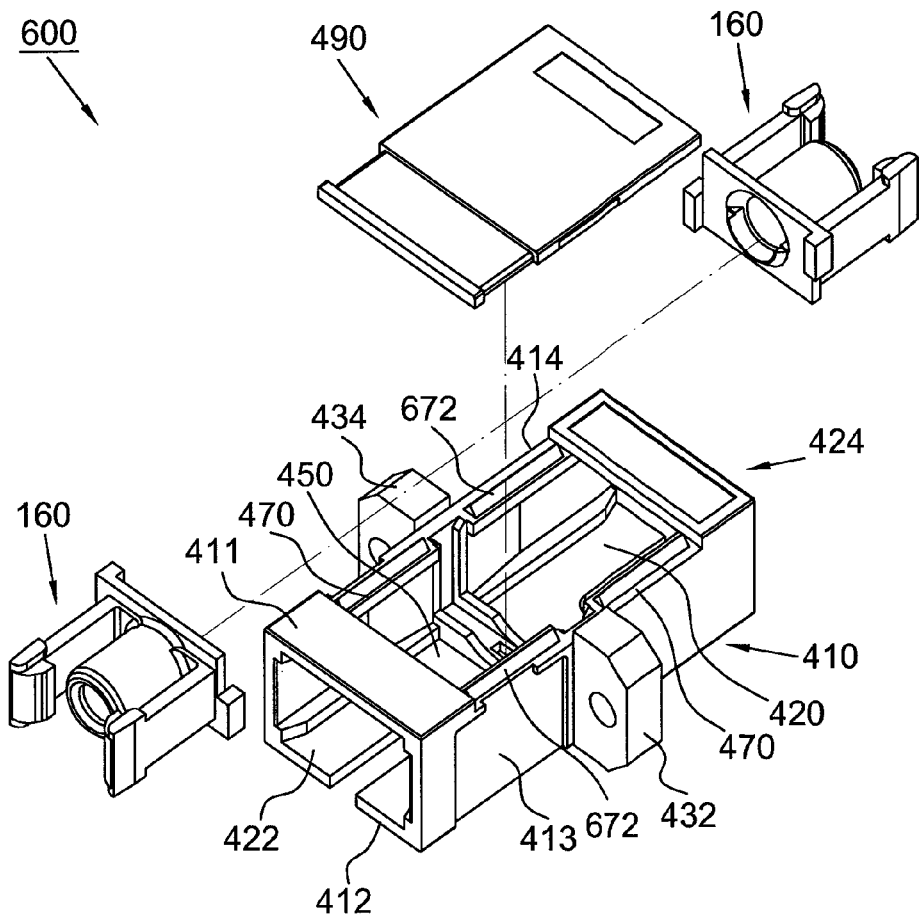
FIG. 6 is an elevated perspective view of the one-piece optical fiber adapter according to the second embodiment of the present invention.
Figure 7:
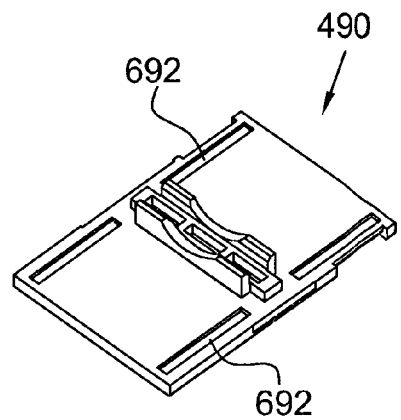
FIG. 7 is an elevated perspective view of the cover plate of the one-piece optical fiber adapter according to the second embodiment of the present invention.

Referring to FIGS. 6 and 7, the one-piece optical fiber adapter 600 according to the second embodiment of the present invention is substantially the same as the optical fiber adapter 400 and the differences between them are that each the protruding portion 470 of the adapter 600 is provided with a protrusion 672 formed thereon and facing the access opening 450. Furthermore, the cover plate 490 of the adapter 600 has a plurality of rectangular indentations 692 arranged corresponding to the protrusions 672.

Similarly, when desiring to assemble the optical fiber adapter 600, the inner housing 160 of FIG. 1 is inserted into the axial cavity 420 through the access opening 450. Afterward, the protrusions 672 on the protruding portions 470 are ultrasonically melted and the cover plate 490 is brought to cover the access opening 450. At this moment the molten protrusions 672 will bond to the cover plate 490.

Since the indentations 692 are present on the cover plate 490, the molten protrusions 672 will be received and confined in the indentations 692 when the cover plate 490 covers the access opening 450. This solves the prior art problem of the overflow of the molten protrusions 672.

Figure 8:
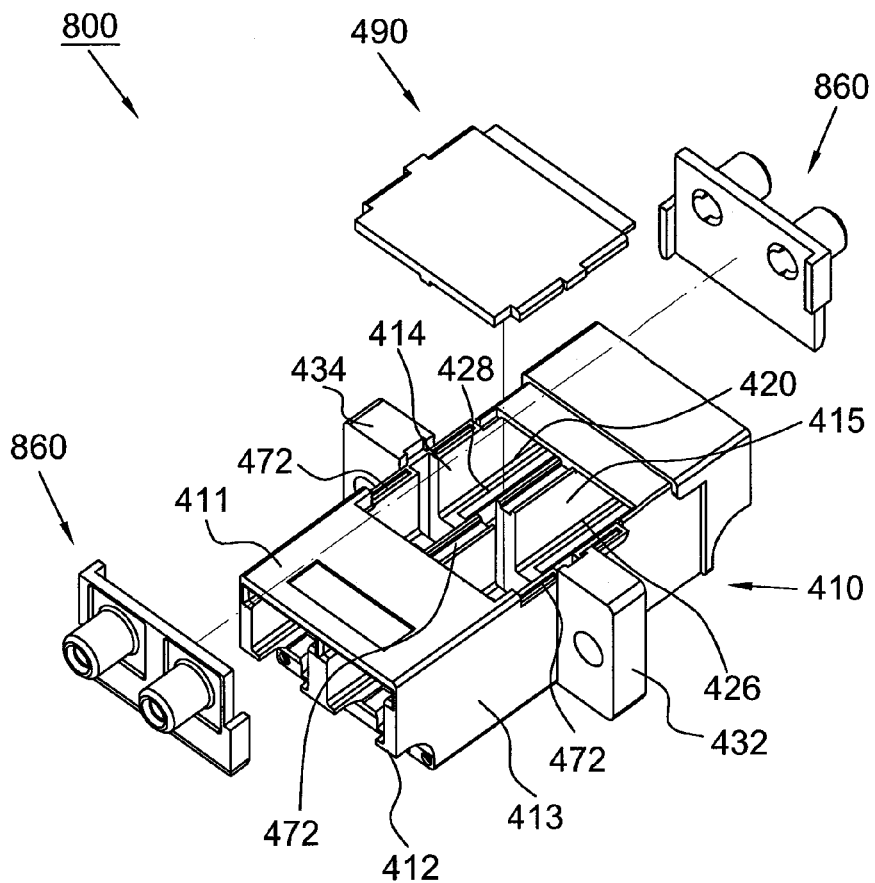
FIG. 8 is an elevated perspective view of the one-piece optical fiber adapter according to the third embodiment of the present invention.
Figure 9:
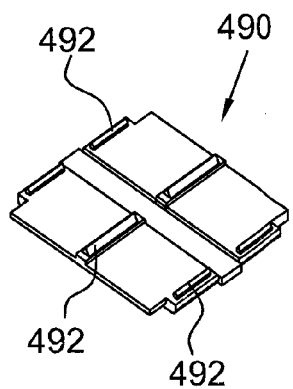
FIG. 9 is an elevated perspective view of the cover plate of the one-piece optical fiber adapter according to the third embodiment of the present invention.

Referring to FIGS. 8 and 9, the one-piece optical fiber adapter 800 according to the third embodiment of the present invention is a duplex optical fiber adapter. The optical fiber adapter 800 further includes a compartment wall 415 positioned in the axial cavity 420. The compartment wall 415 connects with the top wall 411 and bottom wall 412 and divides the axial cavity 420 into two halves. The half of the axial cavity 420 defined by the top wall 411, bottom wall 412, compartment wall 415 and right wall 413 is named as the right axial cavity 426 and the other half of the axial cavity 420 defined by the top wall 411, bottom wall 412, compartment wall 415 and left wall 414 is named as the left axial cavity 428. In addition, the rectangular indentations 472 are positioned on the tops of the left wall 414, right wall 413 and compartment wall 415 and face the access opening 450. The bar protrusions 492 are positioned on the cover plate 490 and corresponding to the indentations 472.

When desiring to assemble the optical fiber adapter 800, an inner housing 860 is inserted into the axial cavity 420 through the access opening 450. Afterward, the protrusions 492 on the cover plate 490 are ultrasonically melted and the cover plate 490 is brought to cover the access opening 450. At this moment the molten protrusions 492 will bond to the tops of the left wall 414, right wall 413 and compartment wall 415.

Similarly, since the indentations 472 are present on the tops of the left wall 414, right wall 413 and compartment wall 415, the molten protrusions 492 will be received and confined in the indentations 472 when the cover plate 490 covers the access opening 450. This solves the prior art problem of the overflow of the molten protrusions 492.

Figure 10:
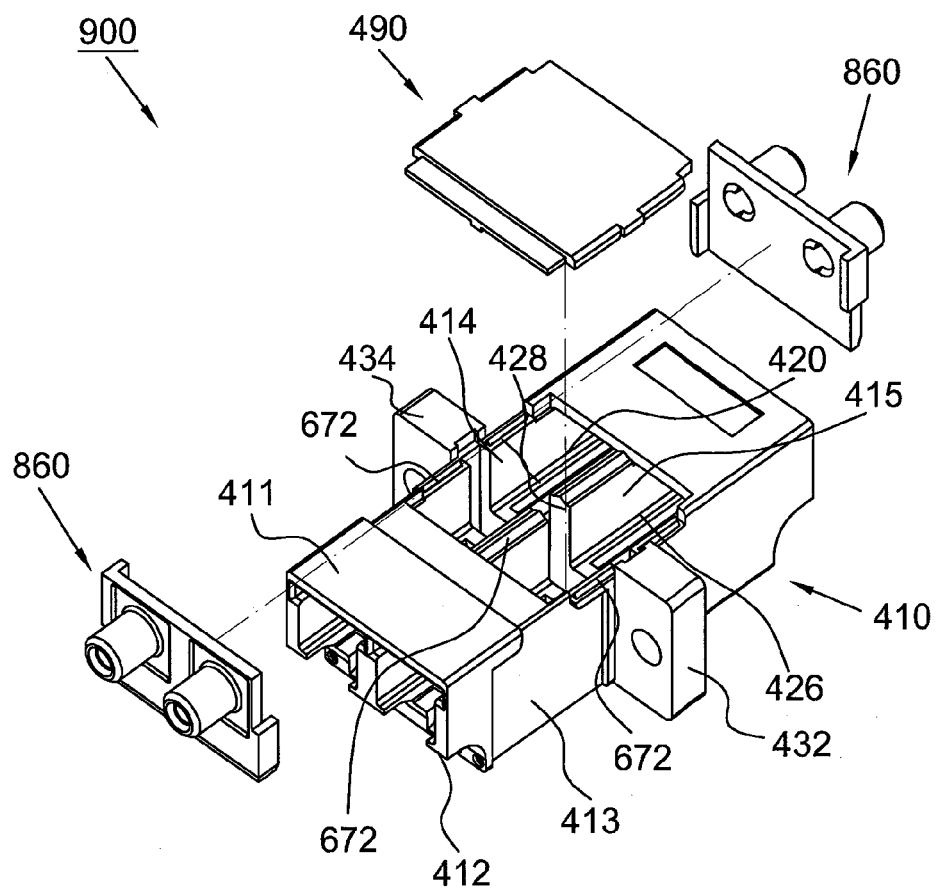
FIG. 10 is an elevated perspective view of the one-piece optical fiber adapter according to the fourth embodiment of the present invention.
Figure 11:
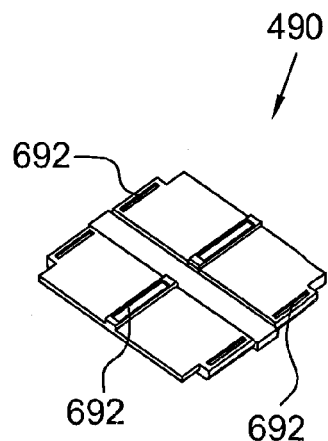
FIG. 11 is an elevated perspective view of the cover plate of the one-piece optical fiber adapter according to the fourth embodiment of the present invention.

Referring to FIGS. 10 and 11, the one-piece optical fiber adapter 900 according to the fourth embodiment of the present invention is substantially the same as the optical fiber adapter 800 and the differences between them are that each of the left wall 414, right wall 413 and compartment wall 415 is provided with a protrusion 672 formed on the tops thereof. Furthermore, the cover plate 490 of the adapter 900 has a plurality of rectangular indentations 692 arranged corresponding to the protrusions 672.

Similarly, when desiring to assemble the optical fiber adapter 900, the inner housing 860 is inserted into the axial cavity 420 through the access opening 450. Afterward, the protrusions 672 on the tops of the left wall 414, right wall 413 and compartment wall 415 are ultrasonically melted and the cover plate 490 is brought to cover the access opening 450. At this moment the molten protrusions 672 will bond to the cover plate 490.

Since the indentations 692 are present on the cover plate 490, the molten protrusions 672 will be received and confined in the indentations 692 when the cover plate 490 covers the access opening 450. This solves the prior art problem of the overflow of the molten protrusions 672.

It will be appreciated that the optical fiber adapters of the present invention can be SC, LC or other types of optical fiber adapters. Moreover, simplex, duplex or other multiplex optical fiber adapter can be adopted to achieve the present invention.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. An optical fiber adapter, comprising:
    a main body having an axial cavity defined by a first wall, a second wall, a third wall and a fourth wall, the first wall facing the third wall and connecting with the second and fourth walls, the axial cavity having two opposing axial openings, an access opening being arranged on the first wall, a plurality of protruding portions being positioned on the second and fourth walls, respectively, wherein each the protruding portion has an indentation formed thereon and facing the access opening;
    an inner housing; and
    a cover plate configured to cover the access opening on the first wall of the main body, wherein the cover plate has a plurality of protrusions formed thereon and positioning corresponding to the indentations on the protruding portions of the main body,
    wherein the axial cavity of the main body is configured to receive the inner housing, the access opening on the first wall is configured for the inner housing to place within the axial cavity of the main body, and the indentations on the protruding portions of the main body are configured to receive the molten protrusions when the protrusions on the cover plate are melted and the cover plate is brought to cover the access opening.

2. The optical fiber adapter as claimed in claim 1, wherein the indentations are rectangular.

3. The optical fiber adapter as claimed in claim 1, wherein the optical fiber adapter is an SC or LC type optical fiber adapter.

4. An optical fiber adapter, comprising:
    a main body having an axial cavity defined by a first wall, a second wall, a third wall and a fourth wall, the first wall facing the third wall and connecting with the second and fourth walls, the axial cavity having two opposing axial openings, an access opening being arranged on the first wall, a plurality of protruding portions being positioned on the second and fourth walls, respectively, wherein each the protruding portion has a protrusion formed thereon and facing the access opening;
    an inner housing; and
    a cover plate configured to cover the access opening on the first wall of the main body, wherein the cover plate has a plurality of indentations formed thereon and arranged corresponding to the protrusions on the protruding portions of the main body,
    wherein the axial cavity of the main body is configured to receive the inner housing, the access opening on the first wall is configured for the inner housing to place within the axial cavity of the main body, and the indentations on the cover plate are configured to receive the molten protrusions when the protrusions on the protruding portions of the main body are melted and the cover plate is brought to cover the access opening.

5. The optical fiber adapter as claimed in claim 4, wherein the indentations are rectangular.

6. The optical fiber adapter as claimed in claim 4, wherein the optical fiber adapter is an SC or LC type optical fiber adapter.

7. An optical fiber adapter, comprising:
    a main body having an axial cavity defined by a first wall, a second wall, a third wall and a fourth wall, the first wall facing the third wall and connecting with the second and fourth walls, the axial cavity having two opposing axial openings, an access opening being arranged on the first wall, wherein each of the second and fourth walls has an indentation formed on the top thereof;
    an inner housing; and
    a cover plate configured to cover the access opening on the first wall of the main body, wherein the cover plate has a plurality of protrusions formed thereon and positioning corresponding to the indentations on the tops of the second and fourth walls,
    wherein the axial cavity of the main body is configured to receive the inner housing, the access opening on the first wall is configured for the inner housing to place within the axial cavity of the main body, and the indentations on the tops of the second and fourth walls are configured to receive the molten protrusions when the protrusions on the cover plate are melted and the cover plate is brought to cover the access opening.

8. The optical fiber adapter as claimed in claim 7, wherein the indentations are rectangular.

9. The optical fiber adapter as claimed in claim 7, wherein the optical fiber adapter is an SC or LC type optical fiber adapter.

10. An optical fiber adapter, comprising:
    a main body having an axial cavity defined by a first wall, a second wall, a third wall and a fourth wall, the first wall facing the third wall and connecting with the second and fourth walls, the axial cavity having two opposing axial openings, an access opening being arranged on the first wall, wherein each of the second and fourth walls is provided with a protrusion formed on the top thereof;
    an inner housing; and
    a cover plate configured to cover the access opening on the first wall of the main body, wherein the cover plate has a plurality of indentations formed thereon and arranged corresponding to the protrusions on the tops of the second and fourth walls,
    wherein the axial cavity of the main body is configured to receive the inner housing, the access opening on the first wall is configured for the inner housing to place within the axial cavity of the main body, and the indentations on the cover plate are configured to receive the molten protrusions when the protrusions on the tops of the second and fourth walls are melted and the cover plate is brought to cover the access opening.

11. The optical fiber adapter as claimed in claim 10, wherein the indentations are rectangular.

12. The optical fiber adapter as claimed in claim 10, wherein the optical fiber adapter is an SC or LC type optical fiber adapter.

* * * * *